United States Patent [19]

White et al.

[11] 3,777,103

[45] Dec. 4, 1973

[54] PIPE WELDING APPARATUS

[75] Inventors: Duncan A. White; William O. Morrison, both of Kirtland, Ohio

[73] Assignee: The Lincoln Electric Company, Cleveland, Ohio

[22] Filed: Sept. 19, 1972

[21] Appl. No.: 290,319

Related U.S. Application Data

[63] Continuation of Ser. No. 7,730, Feb. 2, 1970, abandoned.

[52] U.S. Cl. ................................ 219/60 A, 228/45
[51] Int. Cl. .......................................... B23k 9/02
[58] Field of Search ................ 219/60 A, 60 R, 61, 219/125 R, 125 PL, 137; 228/45

[56] References Cited
UNITED STATES PATENTS

| | | | |
|---|---|---|---|
| 3,324,275 | 6/1967 | Peigren | 219/60 R |
| 3,277,567 | 10/1966 | Reippel et al. | 219/60 A X |
| 3,678,239 | 7/1972 | Hill | 219/60 A |

FOREIGN PATENTS OR APPLICATIONS

| | | | |
|---|---|---|---|
| 1,339,189 | 8/1963 | France | 219/60 A |
| 1,411,529 | 8/1965 | France | 219/60 A |

*Primary Examiner*—R. F. Staubly
*Assistant Examiner*—L. A. Schutzman
*Attorney*—James H. Tilberry et al.

[57] ABSTRACT

Welding apparatus for automatically welding in the groove formed by the adjacent ends of large diameter pipes comprised of welding heads mounted on a carriage having three coplanar guide wheels such that the end guide wheels are spaced at least greater than 180° from each other, which wheels forcibly engage the weld groove surfaces and guide the welding heads around the pipe in perfect alignment with the weld groove. Usually two welding heads are provided so that the welding is substantially continuous from start to finish.

9 Claims, 5 Drawing Figures

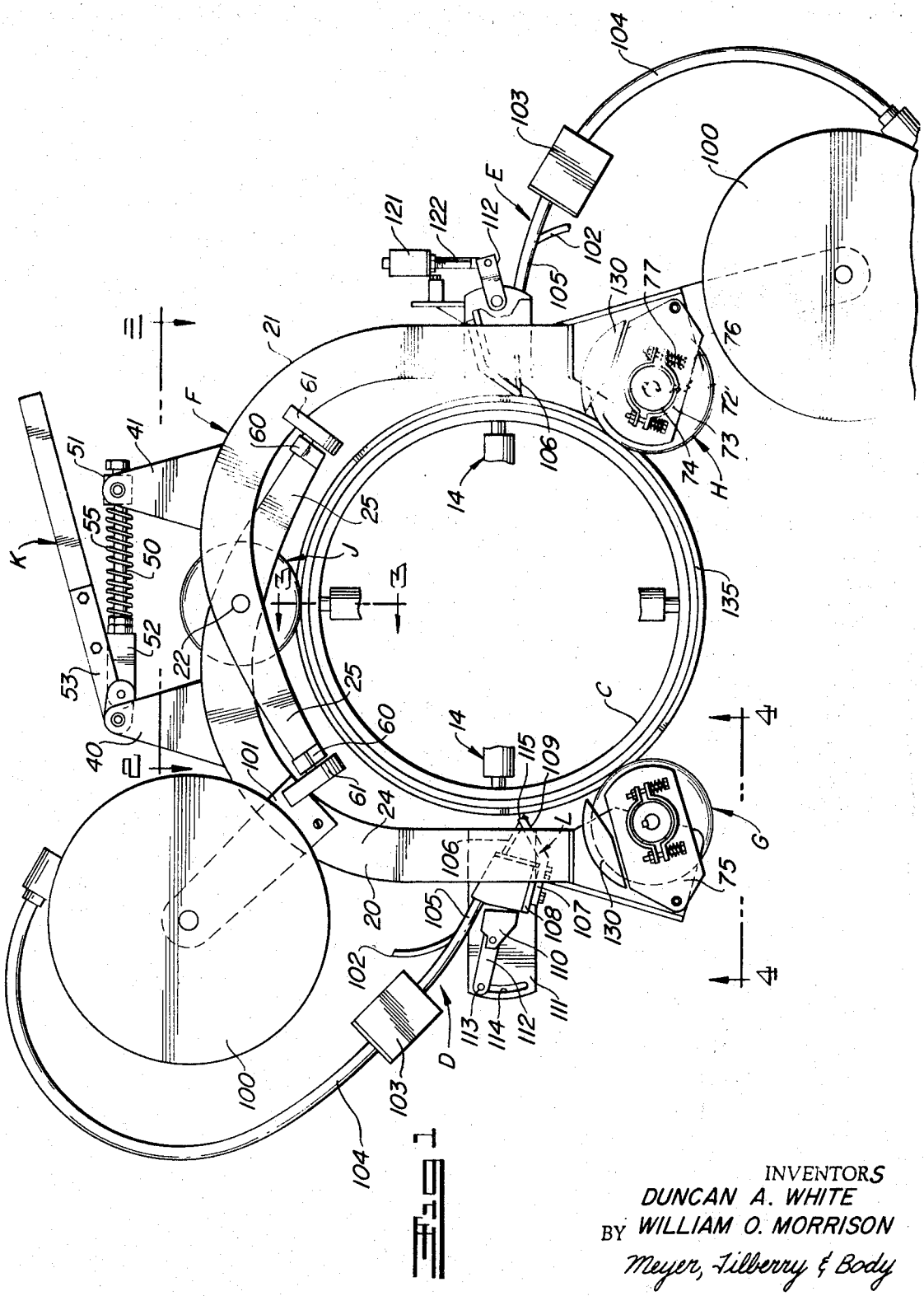

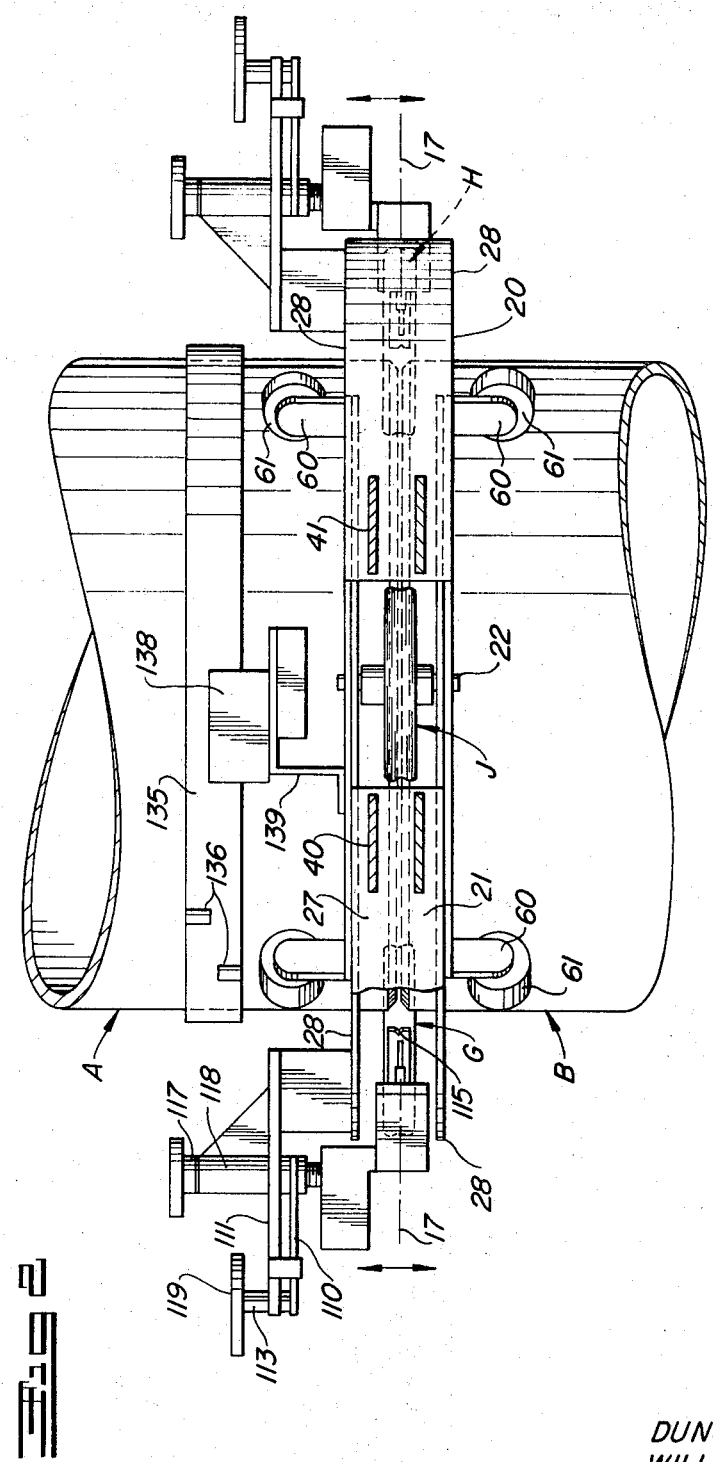

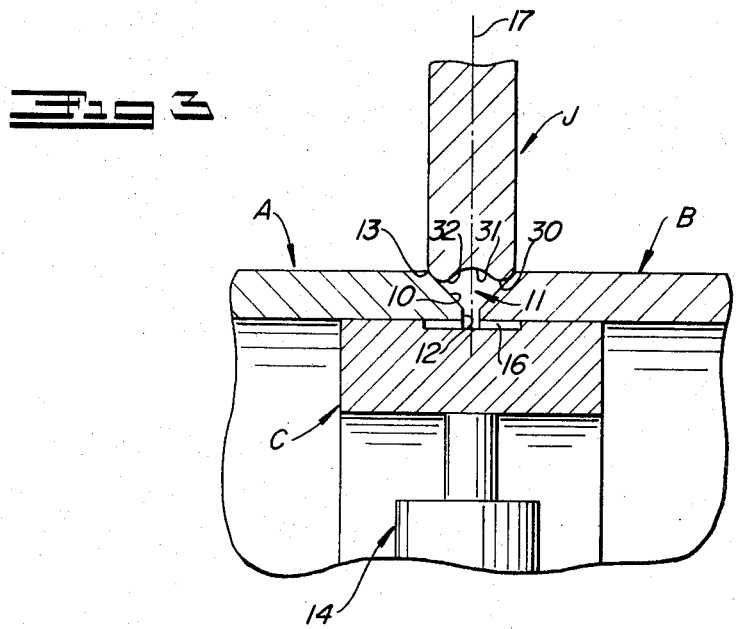
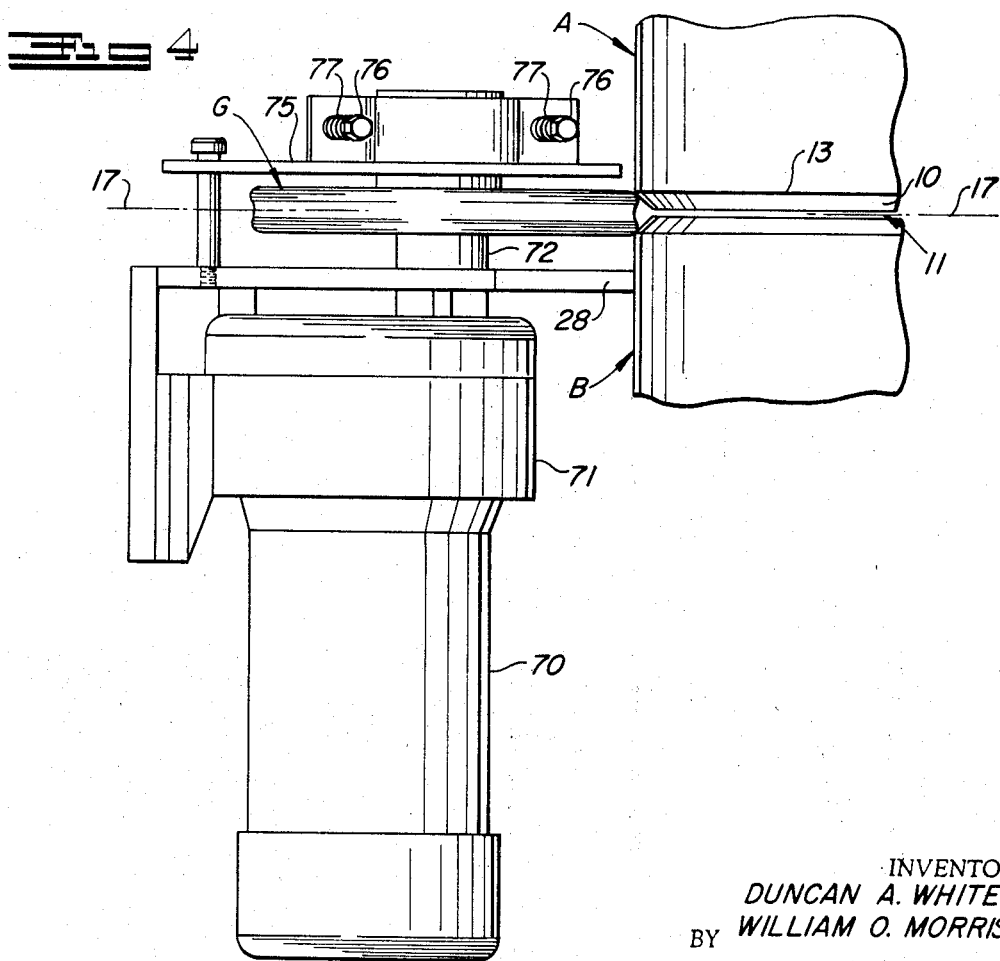

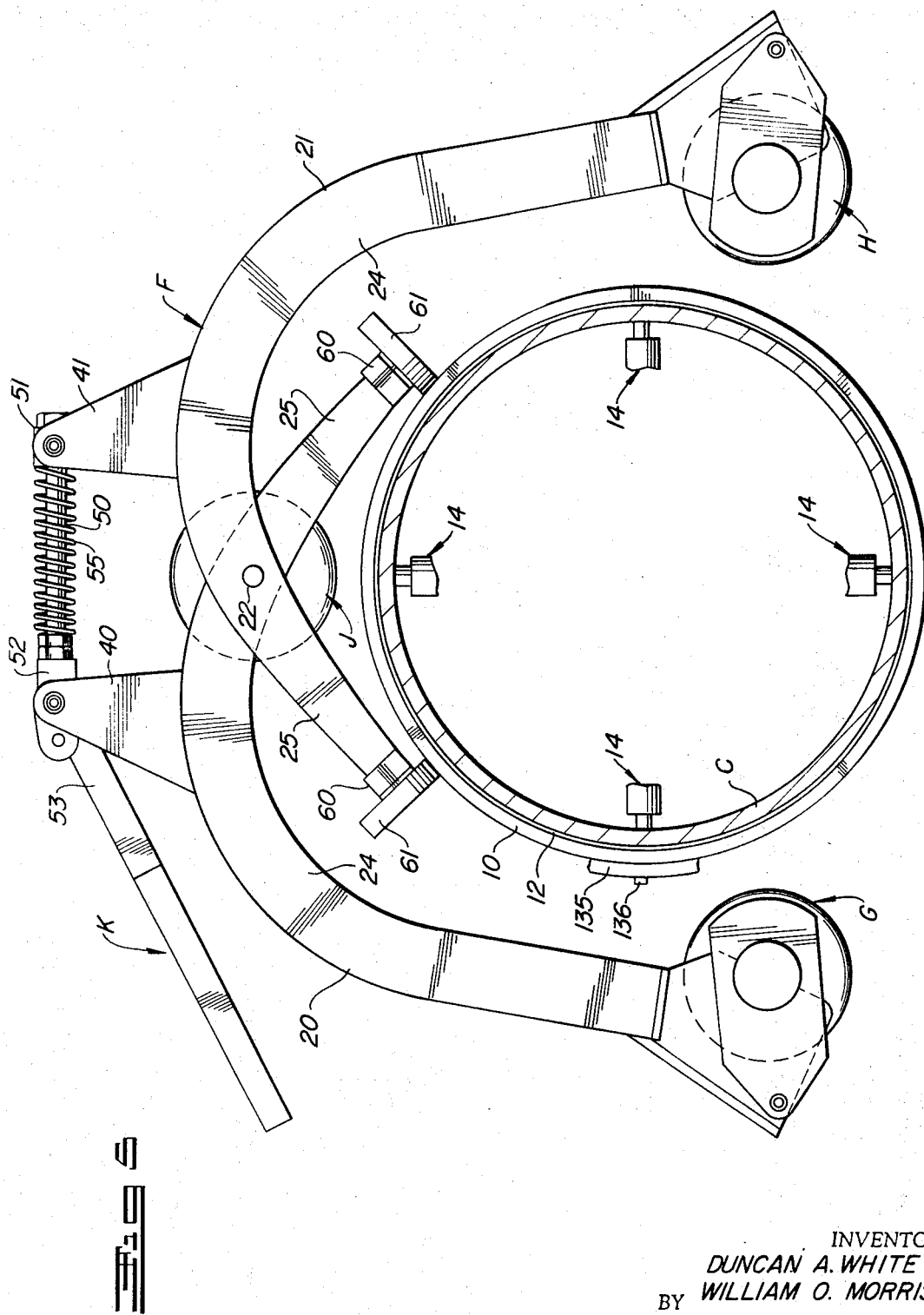

PIPE WELDING APPARATUS

This is a continuation of application Ser. No. 7,730 filed Feb. 2, 1970, now abandoned.

This invention pertains to the art of arc welding and more particularly to method and apparatus for accurately positioning arc welding heads and automatically carrying out an arc welding process.

The invention is particularly applicable to the field of butt welding the ends of large diameter steel pipes and will be described with particular reference thereto although it will be appreciated that the invention or certain aspects thereof are equally applicable to other electric arc welding processes.

In the art of butt welding the ends of large diameter pipes, it is conventional to machine the ends of each pipe to provide an external bevel and a narrow flat land; bring the machined ends into axial alignment with the lands in close but usually spaced relationship to form a weld groove, and then move one or more welding heads around the pipe so as to effect a 360° weld. The weld is usually made is several steps, namely a root pass wherein at least the inner edges or lands of the pipes are fused and the space between lands filled with weld metal, and then several filler passes where the spaced formed by the bevel is filled so that the weld metal is at least flush with the outer surface of the pipe.

Just before and during the root pass, the ends of the pipes must be held in very accurate alignment which can be difficult and time consuming because the length of the new pipe being added is often 40 to 80 feet long and its free end must be accurately located and then held in position.

The root pass is the most critical part of the welding operation in two respects, namely, a 100 percent sound weld bead must be laid down in the minimum amount of time. The time factor is that required to set up the welding apparatus once the ends are aligned and then to carry out the actual welding operation. It is this time cycle which determines the speed at which a pipe line can be laid. Once the root pass is completed, the alignment of the pipes is assured and the welding of the next joint down the line can then be commenced. The filler passes on the previous joint can then be made at a more leisurely pace. Thus, the set up time for the welding heads in relation to each joint and the time required to carry out the actual root pass welding determine the speed at which a pipe line can be laid.

As to the first mentioned critical factor, 100% soundness means obtaining under these severe time limitations complete fusion of both of the lands clear through to the innersurface and a complete filling of the space between such lands with weld metal such that there is a slightly convex weld bead on the innersurface of the pipes.

Depositing of weld metal in the joint is difficult because of the impossibility of rotating the pipe during welding. Thus, the weld must be made by moving the weld heads around the pipe such that the welding position varies from: down-hand welding at the top or the 12 o'clock position; to vertical up or down welding at the sides or the nine or 3 o'clock position; to overhead welding at the bottom or the 6 o'clock position.

A further problem has been that the end of the new pipe may move slightly just after the weld bead is started and before the length of weld bead completed is long enough to have enough strength to resist the forces caused by such movement and the leverage of a 40 to 80 foot pipe. The result is that the partially completed weld bead cracks. Such a cracked bead must be chipped out and the weld repeated.

Various ways have been proposed in the past of automatically carrying out these welding operations, such as a fixture which clamps to the outer surface of the pipe and supports one or more welding heads as they move around the pipe and carry out the required welding operation. With such apparatus heretofore the fixture has had to be carefully positioned on the pipe so as to bring the welding heads exactly into the median plane of the joint. The time required for such alignment is detrimental.

Because of the problems of accurate alignment and the need to insure complete fusion of both lands, processes used heretofore have often oscillated the ends of the electrode transversely of the joint. Such an oscillating process is relatively slow. Others have tried multiple welding heads arranged in tandem which would complete the entire weld including the root pass and the filler passes in a single operation. Sometimes the root pass is made from the inside of the pipes. Such operations require an unduly long time cycle.

The present invention comtemplates new and improved means and method for making the root pass on the ends of steel pipes which overcomes all of the above difficulties and others and provides apparatus which can be positioned in a minimum of time and will insure a 100 percent sound weld with a minimum time cycle between successive welds.

In accordance with the invention, an elongated circumferentially extending carriage is provided of an arcuate length to surround at least 180° of the pipe and which includes at least three coplanar guide wheels mounted for rotation on parallel axes with the wheels at the ends of the carriage being spaced at least in excess of 180° and preferably from 200° to 300°, which wheels have a peripheral shape and width such as to engage the walls or outer corners of a groove parallel with or coincident with the weld groove formed by the beveled edges of the pipes. The carriage is arranged so that at least one of the end wheels may be moved radially outwardly so that the carriage can be positioned around the pipe and then inwardly until all of the wheels engage with the walls or outer corners of the groove.

At least one welding head is mounted on the fixture having an electrode nozzle with an axis spaced from the plane defined by the median of the edge engaging surfaces of the three wheels an amount equal to the intended spacing of the guide groove from the weld groove. In the preferred embodiment, the weld groove is also the guide groove so that the spacing is zero, that is to say, the electrode axis is exactly in the median plane of the three wheels.

In accordance with another aspect of the invention, the welding head includes an electrode nozzle having an exit end spaced from the surface of the pipe to provide an electrode stick-out in combination with a guide member for the stickout portion of the electrode. The guide member is located adjacent to the surface of the pipe for insuring that the electrode axis is always fixed relative to the median plane of the three wheels.

In accordance with a further aspect of the invention, means are provided for electrically energizing the guide member.

Further in accordance with the invention, an electrode reel is mounted on the welding fixture with its axis parallel to the wheel axes and its median plane generally in the median plane of the joint groove in combination with an arcuate coplanar electrode guide from the reel to the wire feeder so that the electrode is straightened a minimum amount from its curvature on the reel as it passes from the reel to the wire feeder and so that the plane of the curve is coplanar with the joint groove.

In accordance with a further aspect of the invention, the carriage includes a pair of relatively pivoted arms, each arm having a wheel pivoted at the outer end thereof, and the third wheel pivotally supported adjacent the pivot point of the arms, in combination with means for relatively pivoting the arms and moving the end wheels into and out of engagement with the walls of the groove.

Further in accordance with this aspect of the invention, the arms cross and are relatively pivoted at the crossover point. The free ends of the arms remote from the end wheels have travel rollers rotatably carried thereby on an axis perpendicular to the pipe axis. The arrangement is such that when the arms are pivoted: (1) in an opening direction to remove the end guide wheels from the groove, the travel rollers are moved downwardly to engage the surface of the pipe and raise the third wheel from engagement with the groove whereby the entire carriage may be rolled along the length of the pipe either to more easily adjust the carriage relative to the groove or advance it to the next joint; (2) or in a closing direction, the travel rollers are raised out of engagement with the pipe, the third roller drops into the groove and the end rollers move into the groove to quickly and accurately align the carriage and hence the electrode with the median plane of the groove.

Further in accordance with another aspect of the invention, a method of welding large diameter pipe is provided comprised of (a) positioning first and second welding heads adjacent to the pipe in fixed circumferentially spaced relationship; (b) moving both heads circumferentially and welding with the first head from approximately the five to 6 o'clock position; (c) moving the heads circumferentially and welding with the second head from the 12 o'clock position to an end of the first weld; and (d) moving the heads circumferentially in the opposite direction and welding from the 12 o'clock position to the other end of the first weld. Using such a process, weld beads spaced approximately 180° apart are completed in the minimum length of time giving maximum strength against any subsequent accidental movement of the free end of the new pipe. The welding of steps (b) and (c) can be done simultaneously if the power source has sufficient current rating or two power sources are provided. In some instances, if the maximum early strength is not needed, step (b) may be omitted.

The principal object of the invention is the provision of the new and improved welding apparatus particularly intended for the automatic welding of the ends of pipe which can be quickly placed into operative relationship on the pipe, which automatically insures exact alignment of the electrode axis with the weld joint to be welded and enables a weld joint to be completed in a minimum amount of time.

Another object of the invention is the provision of new and improved welding apparatus for pipe joints which is simple in construction, light in weight, is easily moved from weld joint to weld joint, and quickly placed in welding position.

Another object of the invention is the provision of a new and improved method of welding pipe joints which very quickly placed two welds on a pipe joint, spaced a substantial arcuate distance apart so as to give, in a minimum amount of time, to the joint a maximum strength against movement of the free end of a new pipe being jointed to existing pipe.

Still another object of the invention is the provision of a new and improved carriage for supporting welding heads while welding the pipe joint which is readily clamped around the pipe but when unclamped raises the fixture from the pipe so it can be rolled axially along the pipes to the next joint.

Another object of the invention is the provision of a new and improved welding fixture comprised of at least three guide wheels which can be readily moved into the weld joint for quickly and accurately locating the fixture and the welding electrode relative to the weld joint.

Still another object of the invention is the provision of a new and improved pipe welding fixture which uses the weld groove itself for exactly aligning the welding electrode therewith.

The invention may take physical form in certain parts and arrangement of parts, a preferred embodiment of which will be described in detail in this specification and illustrated in the accompanying drawings which are a part hereof and herein:

FIG. 1 is a side or end axial elevational view of welding apparatus illustrating somewhat schematically a preferred embodiment of the invention;

FIG. 2 is a view of FIG. 1 taken on the line 2—2 but with the electrode reels removed for the purposes of clarity;

FIG. 3 is a fragmentary cross-sectional view of FIG. 1 taken approximately on the line 3—3 thereof and showing, in addition, the back-up strip for the weld joint in position;

FIG. 4 is a fragmentary view of FIG. 1 taken approximately on the line 4—4 thereof and showing one of the guide wheels in operative position together with its drive mechanism;

FIG. 5 is an end view somewhat similar to FIG. 1, but without the welidng heads and showing the carriage in the open position whereby it may be removed from around pipe or moved axially of the pipe.

Referring to the drawings wherein the showings are for the purpose of illustrating a preferred embodiment of the invention only and not for the purpose of limiting same, the figures show a pair of pipes A, B in axially aligned close spaced relationship with a back-up strip C on the inside overlapping the space and with the welding apparatus of the present invention in welding position. The welding apparatus shown includes a pair of welding heads D, E mounted on an elongated arcuate carriage F, which extends circumferentially around the pipes A, B and which includes a pair of end guide wheels G, H and an intermediate or center guide wheel J. In the embodiment shown, these wheels G, H, J are coplanar and are mounted for rotation on parallel axes. Each has a periphery which engages in the space or groove between the pipes A, B to be welded.

The pipes A, B may have any desired diameter and wall thickness and may be made of any weldable material. A typical pipe with which the preferred embodiment has been successfully used is 18 inches in diameter, is of ordinary low carbon steel and has a one-half inch wall thickness. The ends of the pipes prior to having been brought into the position shown in FIG. 2 are machined so as to provide an inwardly beveled surface 10 terminating in a narrow flat surface or land 12, both of which lands are in planes exactly at right angles to the axes of the pipes A, B. These surfaces define the weld joint 11 which must be filled with weld metal in several welding passes, the first of which essentially fuses the lands 12 and fills the space therebetween with weld metal. Subsequent passes with other welding apparatus fills the space between the beveled surfaces 10. This is conventional in pipe welding.

In the embodiment shown, the pipe A is already part of the pipeline and may be referred to hereinafter as the fixed pipe, while the pipe B is to be welded to the pipe A and may hereinafter be referred to as the movable or new pipe. The end of the pipes A, B are held in exact axially aligned relationship with the lands 12 in slightly spaced but exactly parallel relationship by means of a conventional alignment fixture fragmentarily shown at 14 in FIG. 3 which is inserted into pipe A prior to bringing the pipe B into welding position. Such an alignment fixture is well known in the art, forms no part of the present invention and will not be described in detail herein. Suffice it to say that the alignment fixture 14 includes the back-up strip C which, when the pipe B has been placed into welding position is mechanically expanded into pressure engagement with the inside of each of pipes A, B adjacent to the weld joint. The back-up strip C, which is carried by the alignment fixture, is preferably formed of copper and extends circumferentially around the entire inner periphery of the weld joint. This back-up strip C has a circumferentially extending groove 16 in its outer surface which is symmetrically located relative to the median plane 17 of the weld joint. While the use of a copper back-up strip is well known in the art, the dimensions of the groove 16 have been found to be somewhat critical insofar as the welding operation is concerned. Thus, the groove must be deep enough so that when the welding operation is performed, the metal of the back-up strip will not be fused to such an extent that it will become welded to the steel of the weld bead. However, the groove must not be so deep that it does not assist in shaping the inside of the weld bead and preventing the weld bead from extending too far into the inside of the pipe. In the embodiment shown, the groove has a depth of 0.020 inches and a width of ½ inch. These dimensions are satisfactory for a spacing of the lands of 0.050 inches. It will be appreciated that the depth of the groove may differ for different thicknesses of pipe, different spacings of the lands, different electrodes, different welding speeds, or different welding currents.

Various methods may be provided for accurately spacing the lands when the weld joint is first set up. Inasmuch as these methods are well known, and inasmuch as they do not form a part of the present invention, they will not be detailed further herein. Also, there are various known ways of expanding a copper back-up strip into firm engagement with the inside of the pipes and of filling the circumferential gap created by such expansion and such ways will not be detailed herein. Suffice it to say that the backup ring C should be essentially circumferentially continuous when in welding position.

The carriage F may take a number of different forms, but in the embodiment shown, is comprised of a pair of elongated arcuate arms 20, 21 which are relatively pivoted scissor like by a pivot pin 22 at a point intermediate the length of the arms such that each arm 20, 21 may be said to be divided into a welding branch 24 and a lifting branch 25. The lifting branches 25 are somewhat shorter than the welding branches and extend from the pivot pin so that the ends thereof are on the side of the welding branches nearest to the pipes A, B.

With this arrangement, it will be noted that when the outermost ends of the welding branches 24 are moved toward the surface of the pipe, the ends of the lifting branches 25 will move away from the pipe. In a like manner, when the outermost ends of the welding branches 24 are moved toward the pipe, the ends of the lifting branches 25 will move away from the pipe.

The arms 20, 21 may take any desired configuration, but in the embodiment shown are generally U-shaped in cross section having a base 27 remote from the pipe itself and a pair of parallel legs 28 which extend from the base 27 towards the pipe. As shown, the base 27 of the arm 20 adjacent to the pivot pin is cut away leaving just the legs 28 so that the other arm 21 which at this point is generally reduced in axial thickness, can pass or fit between the legs 28 of the arm 20. The pivot pin 22 extends through the legs 28 of the arms 20, 21 and pivotally supports the intermediate or center guide wheel J between the legs 28 which guide wheel has a diameter such that its periphery extends beyond the inner or lower surface of the arms 20, 21 generally as is shown in FIG. 1.

The guide wheel G is rotatably supported on the end of the welding branch 24 of the arm 20 while the guide wheel H is rotatably supported on the end of the welding branch 24 of the arm 21. Both of these wheels G, H are identical in construction and in the method of mounting them on the ends of their respective arms. Both wheels have a diameter in relation to their pivot axis such that they extend inside of the inner edge of legs 28. Obviously the carriage may be made in a single rigid unit with one of wheels G or H mounted on a pivoted arm so that the apparatus can be removed from a pipe.

In the embodiment shown the wheels G and H as well as the wheel J are mounted for rotation between the legs 28 of the respective arms and in accordance with the invention are all exactly coplanar.

The guide wheels G, H and J have a peripheral surface and axial width such as to engage the outer portions of the beveled surfaces 10. Thus, in the embodiment shown, the periphery of the guide wheel G is comprised, reading from one flat side to the other of a convex surface 30 tangent with a concave surface 31 which in turn is tangent with a second convex surface 32, identical to the surface 30. The median plane of the wheels, when in groove 11, coincides exactly with the median plane 17 of the groove 11. Thus, when the three wheels extend into the weld joint 11 and engage the beveled surfaces 10, the carriage F is exactly located relative to the median plane 17 of weld groove 11 and as the carriage F moves circumferentially around the pipes A, B the carriage will always remain rigidly in this plane. The concave surface 31 is to provide clearance for any deposited weld metal which might build up during the course of the welding. In this respect the guide wheels G, H and J have a surface or peripheral configuration such that when the root pass is completed, the surfaces of the guide wheels will at no time contact the deposited weld metal. If this should happen, the guide wheels might be raised out of engagement with the beveled surfaces 10 or the corners 13 such that the guide wheels could then move slightly in an axial direction thus destroying the previously referred to exact alignment of the carriage F with the weld groove itself.

In the embodiment shown, the guide wheels G, H and J are spaced generally equidistant, that is to say, approximately 120°. In this way, no matter what the circumferential position of the carriage F, it will always remain supported on the pipes A, B. It is to be noted, however, that so long as the wheels G, H are spaced from each other on an angle measured through the carriage itself, by an angle at least greater than, and preferably substantially greater than, 180° this situation will prevail. It is to be noted that the maximum spacing between the intermediate guide wheel J and either wheel G or H must be at least less than and preferably substantially less than 180°.

In order to remove the carriage F from the pipes A, B and in accordance with the invention, one of the wheels G or H or both must be movable away from pipes A, B which in the embodiment shown is done by pivoting the arms 20, 21 about the pivot pin 22. Any desired arrangement for so pivoting the arms 20, 21 may be provided, but in the embodiment shown, the arms 20, 21 generally spaced from the pivot pin 22, each have respectively an upwardly extending toggle arm 40, 41. By pulling the upper ends of these arms 40, 41 together it will be appreciated that the wheels G, H will be moved outwardly such that the carriage F can be removed from around the pipes A, B. By pressing the upper ends of the arms 40, 41 apart, the wheels G, H will be forced into the weld joint 11.

Any desired means may be provided for moving the upper ends of the arms 40, 41 towards and away from each other such as a hydraulic cylinder, a screw arrangement or the like, but in the embodiment shown a mechanically actuated toggle arrangement K is provided. Such toggle arrangement is comprised of an elongated bolt 50 slidable at one end in a block 51 pivoted to the upper end of the arm 41. The other end of the bolt 50 is adjustably threaded into one end of a block 52 pivoted at the other end to a lever arm 53 which lever arm is pivoted to the upper end of arm 40. A compression spring 55 is positioned on bolt 50 and extends between blocks 51, 52.

By rotating the lever arm 53 in a counter-clockwise direction as viewed in FIG. 1, the block 52 will be moved to the left pulling the bolt 50 against the block 51 and drawing the upper ends of the arms 40, 41 together. When the lever arm 53 is moved in the other direction, the upper ends of the arms 40, 41 are moved apart and at the end of the clockwise movement of the lever 53, the bolt 50 slides in the block 51 putting spring 55 under compression which thus resiliently biases the end guide wheels G, H into the weld groove 11. Engagement of wheels G, H in the groove 11 pulls wheel J into the groove by a wedging action.

When the lever arm 53 is moved counter-clockwise to move the end guide wheels G, H away from the pipes A, B, the lifting legs 25 of the arms 20, 21 will move downwardly as shown in FIG. 5 far enough so as to raise the center guide wheel J out of engagement with the groove. The carriage F may then be moved axially of the pipes A, B. In order to facilitate such movement, the ends of the lifting legs 25 are each provided with an axially extending member 60 and a pair of support rollers 61 are pivotally mounted on the ends of these legs 60 on an axis perpendicular to the pipe axis so that the entire weight of the carriage F will be borne by these wheels 61 when the lever 53 is in the counterclockwise position shown in FIG. 5 and all of the guide wheels G, H, J will be spaced from the outer surface of the pipes A, B.

The carriage F may be made to move circumferentially around the pipes A, B in any desired manner, but in the embodiment shown, power means comprised of a high speed electric motor 70, and a reducing gear train 71 connected to the shaft 72 of end guide wheel G. By using a high speed motor driving through a substantial speed reduction to the guide wheel G, small variations in the speed of the motor due to line voltage variations will result in only a minor or in consequential variation in the driven speed of the wheel G. In addition to further stabilize the speed of the wheel G, a friction brake is provided in the form of a pair of brake shoes 73, spring biased against a brake drum 74 keyed to the shaft 72. The brake shoes 73 are suitably fastened to a supporting plate 75 which is fastened to the end of the arm 20. The pressure of the brake shoes 73 against the brake drum 74 are made adjustable by means of bolts 76 which extend through the ends of the brake shoes 73 and bear against a spring 77 to resiliently bias the brake shoes 73 towards the drum 74 at a force which may be adjusted by means of the bolt 76. With this arrangement, the motor 70 is always operating under a predetermined load so that if, as the carriage F with the welding heads D, E mounted thereon moves around the pipes A, B, the actual force required to drive the wheels G varies, the variation will be a small percentage of the total load on the motor 70 and its speed and the speed of the carriage around the pipes A, B will remain substantially constant.

The welding head E is generally comprised of an electrode reel 100 mounted on its respective arm 20 or 21 by means of a bracket 101, an electrode drive mechanism 103 which pulls a welding electrode from the reel 100 through an arcuate tubular guide member 104 and then forces the electrode through an arcuate electrode nozzle 105 which nozzle is suitably energized from a source of electric power (not shown) through a flexible cable 102. The electrode nozzle 105 is mounted on a support member 110 mounted on a supporting bracket 111 fastened to the arm 20. The electrode nozzle 105 has an elongated arcuate passage through which an electrode 106 is fed from reel 100 toward the weld joint 11. The axis of the nozzle passage is exactly aligned with the median plane 17 of guide wheels G, H, J and its exit end is spaced from the weld joint in this instance the outer corners of lands 12 a predetermined distance such that the exposed or stickout position of the electrode 106 will be substantially heated by the welding currents passing therethrough before being subjected to the heat of the arc. The stickout distance may vary from 1 inch to 3 inches. In the preferred embodiment it is two inches for the root bead and ¾ inch for the fill passes.

The support member 110 is pivotally supported on the bracket 111 and has an arm 112 extending radially outwardly which has a bolt 113 extending through an arcuate slot 114 in the bracket member 111. Thus, the support block 110 carrying the nozzle 105 can be pivoted so as to vary the angle of the axis of the electrode passage to the weld joint. This is called the lead angle and is generally such that the electrode points away from the direction of the welding movement. By tightening a nut handle 119 on bolt 113, the support member and nozzle passage may be fixed at any adjusted lead angle.

An adjusting bolt 117 threaded in a sleeve 118 is provided for adjusting the axial position of the support member 110 relative to its mounting bracket 111. An important part of the invention is that the electrode axis is exactly aligned with the median plane of the guide wheels G, H, J which median plane by virtue of the invention is exactly aligned with the median plane of the weld joint.

For the fill passes, a guiding groove can be formed in an auxiliary member fastened to the outside of either pipe A or B which groove is first aligned so as to be exactly parallel to the weld joint 11. The guide wheels G, H, J can then use such auxiliary groove to guide the movement of the carriage F around the pipes A, B. In such instances, the electrode axis of the welding heads will be spaced from the median plane of the guide wheels G, H, J by an amount exactly equal to the spacing of the auxiliary guide groove from the weld joint 11. The preferred embodiment of the invention, particularly for the root pass, uses the surfaces of the weld joint 11 for guiding the carriage F as it moves around the pipes A, B during a welding operation.

An electrode guide L is provided located between the exit end of the electrode passage and spaced preferably less than one inch from the surface of the pipes A, B. Such guide L may take a number of different forms, but in the preferred embodiment, is in the form of a bracket member having a base 107 fastened to the side of support member 110 and electrically insulated therefrom by electrical insulation 108 and a guide leg 109 extending at an angle from the base 107 such as to intersect the axis of the electrode passage in the nozzle 105. The end of the leg 109 has a V-groove 115 therein with the apex thereof exactly aligned with the electrode axis such that as the electrode 106 advances from the electrode nozzle 105, it engages the apex of the groove 115 and is thus guided directly into the weld joint 11. Inasmuch as the apex of the notch 115 is aligned with the passage in the electrode nozzle which in turn is aligned with the median plane of the guide wheels G, H, J, which in turn is aligned with the median plane of the weld joint 11, it will be seen that the end of the electrode 106 is guided exactly into the median plane of the weld joint 11 and at a point as close to the base of the weld joint 11 as it is possible to get. The guide member L acts to prevent any lateral movement of the electrode 106 which could otherwise occur as the stresses in the electrode 106 are relieved by the heating due to the currents flowing therethrough.

Means may be provided for electrically energizing the guide member L such that welding current may be fed to the electrode 106 close to the weld joint 11.

The weld head D is identical in construction to the welding head E with the exception that means are provided for shifting the lead angle of the electrode so that the welding head E may weld when moving in either direction. In the embodiment shown, such means comprise a solenoid 121 having an armature 122 connected to the end of the lever arm 112. The solenoid 121 is mounted on the bracket 111 and when energized in one direction shifts the electrode axis in a clockwise direction so that the lead angle of the electrode will be for welding in a clockwise direction, and when energized in the opposite direction, shifts the lead angle so that the electrode lead angle is for welding in a counter-clockwise direction.

A shield member 130 is located over each guide wheel G, H to prevent weld spatter from falling on the periphery of the wheels.

The median plane of the electrode reel 100 is generally on the median plane of the guide wheels G, H, J. Additionally, the guide tube 104 and electrode nozzle 105 are all generally arcuate in shape with approximately the same arc of curvature and the plane of the arc is coplanar with the median plane of these wheels. Thus the electrode as it feeds from the reel 100 toward the workpiece has a minimum amount of bending and the plane of the curved electrode as it is fed toward the workpiece always remains in the plane of the weld joint 11.

For the purpose of timing the sequence of welding operations to be described, a timing ring 135 is fixed to the outer surface of pipe A, a short distance from the weld groove 11. This timing ring 135 has a plurality of cam members 136 spaced therealong, which are engaged by the actuating arms of a pair of limit switches 138 mounted on a bracket 139 fastened to arm 20. The cams 136 are so located on the timing ring 135 as to engage the actuating arms of the limit switches 138 at the points in the movement of the carriage F around the pipes A, B where the various steps of the welding operation to be described will start.

Various means may be provided for translating the signals received from the limit switches 138 into control of the apparatus but in a preferred embodiment, a stepping switch is employed which advances one step each time a cam is engaged which then starts an operation which continues until the next cam 136 is engaged by the actuating arm of the limit switch 138.

Inasmuch as such apparatus forms no part of the present invention, and is relatively conventional, it will not be described further herein.

The electrode 106 employed and the means for shielding the arc from the atmosphere or fluxing the weld metal form no part of the present invention and will not be described further herein. A tubular electrode manufacture by the assignee of this application is preferred because of its simplicity of use and the ability to develop an arc force which gives deep penetration.

In operation, an aligning fixture carrying the back-up strip C is first positioned in the pipe A in such a manner as to project out of the end thereof and with the groove 16 centered relative to the land 12 of pipe A. The pipe B is then brought into alignment with the pipe A and the lands 12 spaced the desired distance. The alignment fixture is then expanded to force the back-up ring C into pressure engagement with the insides of the pipes A, B on both sides of the weld joint 11 and to exactly align the axes of the pipes A, B. Thereafter, the welding fixture with the toggle handle K in the full counter-clockwise position and thus with the wheels G, H spaced a distance apart greater than the diameter of the pipes A, B is lowered onto the pipes A, B until the wheels 61 engage the upper surfaces of the pipes A, B. The fixture is then moved axially on the pipes A, B until the guide wheels G, H, J are generally aligned with the weld joint 11. The toggle handle K is then rotated in a clockwise direction which forces the legs 40, 41 apart and the wheels G, H toward the pipes A, B. At the same time, the lifting arms 25 and wheels 61 are raised from the surface of the pipes A, B so that the center guide wheel J is lowered into the weld joint 11. Continued rotation of the toggle handle K brings the guide wheel G, H into the weld joint 11. As the toggle handle K is brought to its full clockwise position, the spring 55 biases the three guide wheels G, H, J into firm pressure engagement with the outer corners 13 of the weld joint 11. As such, the guide wheel J is at the 12 o'clock position and the electrode axes intersect the weld groove at approximately the 3 o'clock and 9 o'clock positions.

The sequence of welding operations may be as desired, but in accordance with the preferred embodiment the carriage initially rests on the pipe with the center guide wheel at the 12 o'clock position and the two welding heads E and D at the 3 and 9 o'clock positions respectively. In accordance with the invention, the carriage is first rotated in a clockwise direction as viewed in FIG. 1 by energizing the motors 70. When the welding electrode 106 on the welding head E approaches the 5 o'clock position or preferably slightly thereafter, the electrode drive mechanism 103 is energized to advance the electrode 106 towards the workpiece. At the same time, the electrode nozzle 105 and the auxiliary guide L are electrically energized. When the electrode 106 strikes the workpiece, the arc is struck and welding commences and continues until the electrode end is at the 6 o'clock position. At this point, the electrode 106 of the weld head E and its electrode drive motor are de-energized, thus stopping the welding by head E. At the same time, the electrode drive mechanism 103 of weld head D and the electrode nozzle and auxiliary guide member 109 are electrically energized to drive the electrode 106 towards the workpiece at the 12 o'clock position. The welding fixture continues its rotation in a clockwise direction. The electrode 106 strikes the weld groove and the arc is struck. The welding fixture continues to rotate in a clockwise direction thus laying down a second weld bead from the 12 o'clock position to the beginning of the first weld at approximately the 5 o'clock position. When the electrode 106 reaches the beginning of this first weld, the electrode feed mechanism and electrode are de-energized and the welding stops. The apparatus continues to rotate in a clockwise direction while the electrode 106 of the weld head E moves from the 11 o'clock to the 12 o'clock position, that is to say, the beginning of the second weld bead. At this moment, the direction of rotation of motors 70 is reversed so that the apparatus moves in a counter-clockwise direction. Simultaneously the solenoid 121 is energized to shift the lead angle of electrode 106 of the welding head E, and the electrode feed mechanism 103 and electrode nozzle 105 and auxiliary guide 109 of the welding head E are electrically energized so that the electrode 106 of this welding head moves towards the workpiece and the arc is struck at the beginning of the second weld bead. The welding then continues in a counterclockwise direction until the arc reaches the end of the first weld when the electrode motor and electrode are de-energized. Thereafter, the motors 70 continue to rotate the carriage in a counter-clockwise direction until it reaches the original starting position shown in FIG. 1. At this point, the root pass is completed. The handle K is moved in a counter-clockwise direction to remove the wheels G, H from the weld groove and thereafter bring the wheels 61 into engagement with the upper surface of the now welded pipes A, B and raise the guide wheel J out of the weld groove. The welding fixture is then ready to be moved to the next weld joint. Thereafter, the remainder of the weld joint may be filled using other welding apparatus.

The preferred embodiment of the invention employs two welding heads. It will be appreciated that in some instances, it is possible to use only one welding head which welds first from the 12 o'clock through the 3 o'clock to the 6 o'clock position, and then from the 12 o'clock through the 9 o'clock to the 6 o'clock position. The use of two welding heads is, of course, faster than one welding head, because substantially no time is lost between the ending of one weld and the commencement of the next. Thus, in the sequence above described, the only welding time lost is for the first head to move from the 3 o'clock position to the 5 o'clock position, for the second head to move from the 11 o'clock to the 12 o'clock position and for the heads to return from the 6 o'clock or 12 o'clock positions to the 9 o'clock and 3 o'clock positions respectively. Furthermore, the use of two welding heads on the fixture provides an arrangement where the weight of one welding head counterbalances the weight of the other welding head.

It is also possible in accordance with the invention to weld from the 5 to 6 o'clock position, then from the 12 to 6 o'clock through the 9 o'clock position and then from 12 to 5 o'clock through the 3 o'clock position. In such case, the solenoid 121 is unnecessary. 5 o'clock to 6 o'clock is, of course, 7 o'clock to 6 o'clock when viewed from the opposite axial direction. By spacing the welding heads other than 180° it is possible to start the 5 o'clock and first 12 o'clock weld simultaneously. Also in accordance with the invention, if the 5 to 6 o'clock weld is found unnecessary, it is possible to weld from the 12 o'clock to the 6 o'clock positions through first the 3 o'clock and then the 9 o'clock positions.

With the preferred welding method described, it will be appreciated that within a very brief period of time, a weld bead is effected from approximately the 5 o'clock to the 6 o'clock position and then either simultaneously with or even before the completion of this first weld bead, a second weld bead is commenced at the 12 o'clock position, that is to say, 180° spaced from the first weld bead, so that within an absolute minimum period of time, weld beads are laid down with a maximum circumferential spacing. These beads being spaced provide leverage strength to the weld joint such that any tendency of movement of the free end of pipe B is prevented. Cracks in the weld joint which might otherwise tend to occur if a weld bead were commenced from the 12 o'clock position and continued to the 6 o'clock position do not occur. In such event, it will be appreciated that there is a maximum period of time before weld beads are established 180° apart.

Also at all times exact alignment of the electrodes with the median plane of the weld groove is assured. There is no need to resort to oscillating the electrode to insure even fusing of both lands 12. We are aware that single guide wheels have been employed to cause an electrode to follow a weld groove, but in all instances only one has been employed in close proximity to the arc itself. In the present invention, three guide wheels are employed, which are the minimum to define a plane and these wheels can be spaced a substantial distance from the arcs, while giving extremely accurate guidance to the electrodes realtive to the median plane of the weld groove which guidance is absolutely necessary if 100 percent fusion of the entire circumference and width of both lands, together with a convex bead on the inside of the pipes, is to be obtained without oscillating the electrode or by welding from the inside as has been done before. Oscillation results in slow linear speeds of welding. The present invention enables linear weld speeds of 70 inches per minute on the root pass. By locating the guide wheels on the median plane of the arms 20, 21 the problems of torsion due to off center weights are eliminated and accuracy of alignment is facilitated.

Thus, it will be seen that a preferred embodiment of the invention has been described which accomplishes all of the objects of the invention and others. Obviously modifications and alterations to the preferred embodiment will occur to others upon reading and understanding of this specification, and it is my intension to include all such modifications and alterations insofar as they reasonably come within the intended scope of the appended claims.

Having thus described my invention, I claim:

1. Apparatus for electric arc welding the adjacent ends of axially aligned metal pipes which are beveled to form an outwardly diverging weld groove comprising: a circumferentially extending carriage having an arcuate length in excess of 180° and adapted to be suspended from a point generally midway of the ends to be lowered vertically onto said pipes, said carriage including a pair of rigid arms movable relative to said point and adapted to be disposed on opposite sides of said pipes, three coplanar guide wheels mounted on said carriage for rotation about axes parallel to the axis of the pipes and to maintain said carriage radially spaced from said pipes, said axes being fixed relative to their supporting portion of the carriage, said guide wheels having a peripheral shape and width such as to engage the bevels forming the weld groove, one of said guide wheels being mounted on said carriage substantially at said point whereby said one guide wheel will initially engage the weld groove when said carriage is lowered onto said pipes, the other two of said guide wheels each being mounted on one of said rigid arms, the axes of said other two guide wheels being arcuately spaced from said one of said guide wheels in excess of 90° on an angle measured through said carriage, means driving at least one of said guide wheels to move said carriage circumferentially, a welding head mounted on at least one of said arms, said welding head having an electrode nozzle having an electrode passage, the axis of which passage is on the median plane of and close to one of said guide wheels, said arms being movable away from said pipes in a plane parallel to the plane of said wheels whereby said carriage may be lowered over said pipes, said arms also being movable toward said pipes to move said other two guide wheels into engagement with said weld groove, means for biasing said arms toward said pipes to force said three wheels into tight pressure relationship with said weld groove to automatically align the carriage axially relative to the plane of the weld groove and radially relative to the base of the weld groove and maintain such alignment as said carriage moves circumferentially around said pipes.

2. Apparatus for electric arc welding the adjacent ends of axially aligned metal pipes which are beveled to form an outwardly diverging weld groove comprising: a circumferentially extending carriage adapted to surround in excess of 180° of the pipes, said carriage including a pair of rigid arms having pivot ends and opposite ends, said pivot ends being interconnected for pivotal movement about a common axis, three coplanar guide wheels for said carriage mounted thereon for rotation about axes generally parallel to said pivot axis, the axis of one of said guide wheels generally coinciding with said pivot axis, the other two of said three guide wheels each mounted on one of said arms for the axes thereof to be arcuately spaced apart in excess of 180° on an angle measured through said carriage, means adapted to bias said guide wheels toward said pipes and to hold said carriage in gripping relationship around said pipes when said carriage is mounted thereon, said guide wheels having a peripheral shape and width such as to engage the surfaces or outer edges of the bevels forming the weld groove to guide said carriage as it moves circumferentially around the pipes, a welding head mounted on one of said arms intermediate said pivot axis and the corresponding one of the other two guide wheels mounted thereon, said welding head having an electrode nozzle having an electrode passage, and the axis of said passage being on the median plane of said guide wheels.

3. Apparatus according to claim 2, wherein the axis of each of said other two of said three guide wheels is spaced at least 100° from said pivot axis.

4. Apparatus according to claim 2, and a drive motor mounted on one of said arms for driving the corresponding one of said other two guide wheels to move said carriage around the pipes.

5. Apparatus according to claim 2, and a second welding head mounted on the other of said arms in generally diametrically opposed relationship with respect to said welding head on said one arm, said second welding head having an electrode nozzle having an electrode passage the axis of which is on the median plane of said guide wheels.

6. Apparatus according to claim 5, wherein the axis of each of said other two of said three guide wheels is spaced at least 100° from said pivot axis.

7. Apparatus according to claim 6, and a drive motor mounted on one of said arms for driving the corresponding one of other two guide wheels to move said carriage around the pipes.

8. A carriage for supporting at least one arc welding head while welding the seam between two axially aligned pipes comprising a pair of elongated arcuate arms relatively pivoted at a point intermediate the length thereof such that each arm is divided into a relatively long welding branch and a relatively short lifting branch, the lifting branch of each arm extending from the pivot point in opposite directions and on the side of the welding branches adapted to be nearest to the pipes to be welded; each of said lifting branches having rollers associated therewith having an axis of rotation perpendicular to the pipe axis and generally tangent to the pipe surface, each of said welding branches having a guide wheel associated therewith spaced an angle measured through the pivot point of from 200° to 300° and at least a third guide wheel associated with at least one of said arms intermediate said first mentioned guide wheels, all of said guide wheels being coplanar and having parallel axes of rotation, and means for relatively pivoting said arms in one direction whereby said end guide wheels are moved out of engagement with said pipe and said rollers are brought into engagement with the surface of a pipe to raise the intermediate guide wheel from the surface of the pipe or in another direction whereby said rollers are raised from the surface of said pipe and said guide wheels are brought into clamping engagement with the surface of a pipe.

9. Apparatus for electric arc welding in the groove between the adjacent ends of axially aligned metal pipes comprised of an elongated circumferentially extending carriage adapted to surround in excess of 180° of the pipe, a pair of guide wheels one generally at each end of said carriage and at least one intermediate guide wheel generally equidistant from each of the end guide wheels, the axes of said end guide wheels being spaced in excess of 180° on an angle measured through said carriage, all of said guide wheels being coplanar and mounted on said carriage for rotation on parallel axes, means for moving at least one of said end guide wheels toward and away from said pipes whereby said carriage may be installed on said pipes from the sides thereof and whereby when installed said carriage may rotate about the axis of said pipes, said carriage being comprised of a pair of arms pivoted intermediate the ends thereof dividing each of said arms into a welding branch and a lifting branch, said lifting branches being shorter than said welding branches and being disposed on the radially inner side of said welding branches, supporting rollers on each of said lifting branches having an axis of rotation perpendicular to the axis of said pipes and generally tangent to the pipe surface and means for relatively pivoting said arms to either force said guide wheels into pressure engagement with said pipes or to move said end guide wheels away from said pipes and said rollers into engagement with said pipes whereby to raise said intermediate guide wheel from engagement with said pipes.

\* \* \* \* \*